(12) United States Patent
Plianos et al.

(10) Patent No.: US 11,279,359 B2
(45) Date of Patent: Mar. 22, 2022

(54) METHOD AND APPARATUS FOR ASSISTING IN THE MAINTENANCE OF A VEHICLE SPEED WITHIN A SPEED RANGE, AND A VEHICLE COMPRISING SUCH AN APPARATUS

(71) Applicant: JAGUAR LAND ROVER LIMITED, Warwickshire (GB)

(72) Inventors: Alex Plianos, Coventry (GB); Kestutis Jankevicius, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 127 days.

(21) Appl. No.: 16/145,466

(22) Filed: Sep. 28, 2018

(65) Prior Publication Data

US 2019/0100208 A1    Apr. 4, 2019

(30) Foreign Application Priority Data

Oct. 2, 2017    (GB) ..................................... 1716040

(51) Int. Cl.
   *B60W 30/18*    (2012.01)
   *B60W 30/14*    (2006.01)
   (Continued)

(52) U.S. Cl.
   CPC ....... *B60W 30/18072* (2013.01); *B60K 31/00* (2013.01); *B60W 10/02* (2013.01);
   (Continued)

(58) Field of Classification Search
   CPC ....... B60W 30/18072; B60W 50/0097; B60W 10/06; B60W 30/143; B60W 10/08; B60W 2556/50
   See application file for complete search history.

(56) References Cited

U.S. PATENT DOCUMENTS 8,712,674 B2 * 4/2014 Maruyama ............. G08G 1/166
                                                    701/116
8,972,055 B1 * 3/2015 Desai
                    (Continued)

FOREIGN PATENT DOCUMENTS

DE    102008023135 A1    11/2009
DE    10 2011 004 038 A1    8/2011
            (Continued)

OTHER PUBLICATIONS

Search Report for DE Application No. 10 2018 216 003.1 dated Sep. 9, 2019.

(Continued)

*Primary Examiner* — Redhwan K Mawari
(74) *Attorney, Agent, or Firm* — Carlson, Gaskey & Olds, P.C.

(57) ABSTRACT

Method and apparatus for maintaining a speed of a vehicle within a target speed range. A plurality of coasting profiles are generated for the vehicle, each having an initial speed and a starting point on a predicted vehicle path. Each coasting profile represents a predicted vehicle speed over a time and/or distance from the starting point and is generated based on a geometry of at least a portion of the predicted vehicle path. At least one of the coasting profiles that maintains the speed of the vehicle within the target speed range is identified. A prime mover of the vehicle is controlled to place the vehicle into a coasting mode in accordance with the at least one identified coasting profile. Alternatively, feedback is provided to a user to place the vehicle into a coasting mode, such that the vehicle will coast in accordance with the at least one identified coasting profile.

14 Claims, 8 Drawing Sheets

(51) Int. Cl.
  *B60W 50/14* (2020.01)
  *B60W 20/10* (2016.01)
  *F02D 29/02* (2006.01)
  *B60K 31/00* (2006.01)
  *B60W 10/11* (2012.01)
  *B60W 10/02* (2006.01)
  *B60W 50/00* (2006.01)
  *B60W 50/08* (2020.01)
  *B60W 10/06* (2006.01)
  *B60W 10/08* (2006.01)
  *B60W 10/184* (2012.01)
  *F02D 41/00* (2006.01)
  *B60K 6/20* (2007.10)
  *F02D 13/02* (2006.01)

(52) U.S. Cl.
  CPC ............ *B60W 10/06* (2013.01); *B60W 10/08* (2013.01); *B60W 10/11* (2013.01); *B60W 10/184* (2013.01); *B60W 20/10* (2013.01); *B60W 30/143* (2013.01); *B60W 30/146* (2013.01); *B60W 50/0097* (2013.01); *B60W 50/082* (2013.01); *B60W 50/14* (2013.01); *F02D 29/02* (2013.01); *B60K 6/20* (2013.01); *B60K 2031/0091* (2013.01); *B60W 2030/1809* (2013.01); *B60W 2552/20* (2020.02); *B60W 2556/50* (2020.02); *B60W 2710/06* (2013.01); *B60W 2710/08* (2013.01); *B60W 2710/18* (2013.01); *B60Y 2200/92* (2013.01); *B60Y 2300/18066* (2013.01); *F02D 13/02* (2013.01); *F02D 13/0215* (2013.01); *F02D 41/0007* (2013.01); *F02D 41/0047* (2013.01); *F02D 2200/501* (2013.01); *F02D 2200/702* (2013.01)

(56) References Cited

U.S. PATENT DOCUMENTS

| 9,540,004 B2* | 1/2017 | Kim ................. B60W 30/143 |
| 10,029,685 B1* | 7/2018 | Hubbard ............ B60W 30/146 |
| 10,551,842 B2* | 2/2020 | Lonari ................ G01C 21/3617 |
| 2010/0179726 A1* | 7/2010 | Leinung .......... B60W 30/18072 |
| | | 701/36 |
| 2012/0065863 A1* | 3/2012 | Takagi |
| 2015/0019117 A1* | 1/2015 | Huber .................... G08G 1/052 |
| | | 701/119 |
| 2015/0149059 A1* | 5/2015 | Choi |
| 2015/0298699 A1* | 10/2015 | Poechmueller ... B60W 50/0097 |
| | | 701/25 |
| 2016/0101780 A1* | 4/2016 | Park |
| 2016/0121898 A1* | 5/2016 | Jo ......................... B60W 10/02 |
| | | 701/22 |
| 2016/0257309 A1* | 9/2016 | Kumar |
| 2016/0297435 A1* | 10/2016 | D'Amato ............ B60W 30/143 |
| 2017/0144664 A1* | 5/2017 | Yamashita |
| 2018/0244270 A1* | 8/2018 | Tudosie |
| 2018/0284770 A1* | 10/2018 | VandenBerg, III .... G06N 20/00 |
| 2019/0016334 A1* | 1/2019 | Mafrica ................ B60W 30/10 |
| 2019/0100208 A1* | 4/2019 | Plianos ................. B60W 20/10 |
| 2019/0106108 A1* | 4/2019 | Wienecke ............... B60R 11/04 |

FOREIGN PATENT DOCUMENTS

| DE | 10 2012 025 036 A1 | 6/2014 |
| EP | 3 225 488 A1 | 10/2017 |

OTHER PUBLICATIONS

Search Report for DE Application No. 10 2018 215 976.9 dated Jul. 31, 2019.
Combined Search and Examination Report under Sections 17 and 18(3) for Application No. GB1716040.9 dated Mar. 29, 2018.
Combined Search and Examination Report under Sections 17 and 18(3) for Application No. GB1716038.3 dated Mar. 27, 2018.
Combined Search and Examination Report under Sections 17 and 18(3) for Application No. GB1716035.9 dated Mar. 21, 2018.
DE Search Report for Application No. DE 10 2018 215 973.4 dated Nov. 24, 2020.

* cited by examiner

METHOD AND APPARATUS FOR ASSISTING IN THE MAINTENANCE OF A VEHICLE SPEED WITHIN A SPEED RANGE, AND A VEHICLE COMPRISING SUCH AN APPARATUS

CROSS REFERENCE TO RELATED APPLICATION

This application claims priority to United Kingdom Patent Application No. GB 1716040.9, filed on 2 Oct. 2017.

TECHNICAL FIELD

The present disclosure relates to vehicle coasting.

Aspects of the invention relate to a method of assisting in the maintenance of a vehicle's speed within a speed range, apparatus for implementing the method, a vehicle comprising the apparatus.

BACKGROUND

Various driver assistance aids are used in modern vehicles. For example, cruise control may be used to maintain a constant speed within a target speed range without driver input. Cruise control is useful, but in its simplest form has the disadvantage of being inflexible. Constant speed cruise control does not take into account other road users that are travelling more slowly in front of the vehicle for which the speed is being controlled. Accordingly, a driver using cruise control must still be aware of the relative speeds of other vehicles to avoid collisions.

Adaptive cruise control seeks to address at least some of the disadvantages of constant speed cruise control, by adapting the controlled speed to the circumstances. For example, if a vehicle in the same lane is moving more slowly than the vehicle with the adaptive cruise control, the cruise control may adjust the throttle and/or brakes in order to match the speed of the slower car. Such cruise control systems may use, for example, radar to detect vehicles ahead.

Speed control is also an important aspect of autonomous and semi-autonomous vehicle control systems.

There is pressure on vehicle manufacturers to reduce fuel consumption. There are many ways in which fuel consumption may be reduced, ranging from reducing vehicle weight to educating drivers. Cruise control systems do not, in general, seek to improve fuel consumption.

It is an aim of the present invention to address disadvantages of the prior art.

SUMMARY OF THE INVENTION

Aspects and embodiments of the invention provide a method, a controller and a vehicle as claimed in the appended claims According to an aspect of the invention, there is provided a method of assisting in the maintenance of a speed of a vehicle within a target speed range, the method comprising:

generating a plurality of coasting profiles for the vehicle, each coasting profile having an initial speed and a starting point on a predicted vehicle path, where each coasting profile represents a predicted vehicle speed over a time and/or distance from the starting point and is generated based on a geometry of at least a portion of the predicted vehicle path;

identifying at least one of the coasting profiles that maintains the speed of the vehicle within the target speed range; and outputting a coasting signal for either:

controlling a prime mover of the vehicle to place the vehicle into a coasting mode in accordance with the at least one identified coasting profile; or providing feedback to a vehicle user to place the vehicle into a coasting mode, such that the vehicle if placed in the coasting mode by the user will coast in accordance with the at least one identified coasting profile.

The method may comprise adjusting a speed of the vehicle to match the initial speed of the identified coasting profile prior to: placing the prime mover into the coasting mode; providing the feedback to the user; or receiving from the user a response to the feedback. This allows for a wider range of starting speeds, and hence a wider range of potential coasting profiles.

The identified coasting profile may include at least a period within which the speed of the vehicle is greater than the starting speed associated with the identified coasting profile, the additional speed being a result of at least one downhill portion of the predicted vehicle path. By allowing an increase in speed while coasting, fuel economy may be improved.

Identifying the at least one coasting profile may comprise identifying one or more of the coasting profiles for which the coasting time exceeds a threshold. By using a time threshold, unduly short coasting periods may be avoided and the duration of coasting events may be extended.

Identifying the at least one coasting profile may comprise identifying one or more of the coasting profiles for which the coasting distance exceeds a threshold. By using a distance threshold, unduly short coasting periods may be avoided.

Controlling the prime mover or manually placing the vehicle into a coasting mode may comprise one or more of:

placing a transmission associated with the prime mover into neutral;

disengaging a clutch associated with the prime mover;

turning off the prime mover; and modulating one or more engine system actuators, such as an exhaust gas recirculation valve, variable geometry turbocharger, intake throttle, and continuous variable valve timing, so as to reduce or minimise pumping losses. In an example, one or more engine system actuators may take the form of engine air system actuator(s).

The vehicle may include a regenerative power source, and the coasting mode may include regenerative braking. Regeneratively braking in this way may allow a speed of the vehicle to be controlled in such a way that the vehicle may coast further and/or improve its overall fuel efficiency.

The vehicle may include an electric machine, and the coasting mode may include providing drive via the electric machine in order to increase a total coasting distance and/or time. Providing drive in this way may allow a speed of the vehicle to be controlled in such a way that the vehicle may coast further and/or improve its overall fuel efficiency.

The vehicle may include one or more braking mechanisms, and the coasting mode may include providing braking via at least one of the braking mechanisms in order to increase a total coasting distance and/or time. Braking in this way may allow a speed of the vehicle to be controlled in such a way that the vehicle may coast further and/or improve its overall fuel efficiency.

Identifying the at least one coasting profile may comprise selecting a coasting profile that maximises a coasting distance and/or coasting time. Maximising coasting distance and/or coasting time may improve fuel efficiency.

The vehicle may have at least a first speed range that is used in the identifying of the coasting profile, and a second speed range for when the vehicle is not in the coasting mode, wherein the first speed range is wider than the second speed range. The wider first speed range may allow the vehicle to coast further and/or improve its overall fuel efficiency.

According to another aspect of the invention, there is provided a vehicle coasting system for assisting in the maintenance of a speed of a vehicle within a target speed range, the system comprising:

means for generating a plurality of coasting profiles for the vehicle, each coasting profile having an initial speed and a starting point on a predicted vehicle path, where each coasting profile represents a predicted vehicle speed over a time and/or distance from the starting point and is generated based on a geometry of at least a portion of the predicted vehicle path;

means to identify at least one of the coasting profiles that maintains the speed of the vehicle within the target speed range; and means to output a coasting signal for either:

controlling a prime mover of the vehicle to place the vehicle into a coasting mode in accordance with the at least one identified coasting profile; or providing feedback to a user to place the vehicle into a coasting mode, such that the vehicle will coast in accordance with the at least one identified coasting profile.

The means for generating a plurality of coasting profiles for the vehicle, may comprise:

an electronic processor having an electrical input for receiving signals indicative of a value of vehicle speed and upcoming changes in geometry of a predicted vehicle path, and an electronic memory device electrically coupled to the electronic processor and having instructions stored therein, wherein the electronic processor is configured to access the electronic memory device and execute the instructions stored therein such that it is operable to generate said coasting profiles.

The means to identify at least one of the coasting profiles and the means to output a coasting signal may comprise the electronic processor identifying one of said generated coasting profiles and generating said coasting signal in response thereto.

The vehicle coasting system may comprise means for controlling the prime mover of the vehicle to place the vehicle into the coasting mode in accordance with the at least one identified coasting profile.

The vehicle coasting system may comprise means for providing feedback to a user to place the vehicle into a coasting mode, such that the vehicle will coast in accordance with the at least one identified coasting profile.

The vehicle coasting system may comprise means for adjusting a speed of the vehicle to match the initial speed of the identified coasting profile, prior to: placing the prime mover into the coasting mode; providing the feedback to the user; or receiving from the user a response to the feedback. This allows for a wider range of starting speeds, and hence a wider range of potential coasting profiles.

The identified coasting profile may include at least a period within which the speed of the vehicle is greater than the starting speed associated with the identified coasting profile, the additional speed being a result of at least one downhill portion of the predicted vehicle path. By allowing an increase in speed while coasting, fuel economy may be improved.

The means for identifying the at least one coasting profile may be configured to identify one or more of the coasting profiles for which the coasting time exceeds a threshold. By using a time threshold, unduly short coasting periods may be avoided and the duration of coasting events may be extended.

The means for identifying the at least one coasting profile may be configured to identify one or more of the coasting profiles for which the coasting distance exceeds a threshold. By using a distance threshold, unduly short coasting periods may be avoided.

The means for controlling the prime mover may be configured to do any one or more of:

placing a transmission associated with the prime mover into neutral;

disengaging a clutch associated with the prime mover;

turning off the prime mover; and modulating one or more engine system actuators, such as an exhaust gas recirculation valve, variable geometry turbocharger, intake throttle, and continuous variable valve timing, so as to reduce or minimise pumping losses. In an example, one or more engine system actuators may take the form of engine air system actuator(s).

The vehicle may include a regenerative power source, and the coasting mode may include regenerative braking. Regeneratively braking in this way may allow a speed of the vehicle to be controlled in such a way that the vehicle may coast further and/or improve its overall fuel efficiency.

The vehicle may include an electric machine, and the coasting mode may include providing drive via the electric machine in order to increase a total coasting distance and/or time. Providing drive in this way may allow a speed of the vehicle to be controlled in such a way that the vehicle may coast further and/or improve its overall fuel efficiency.

The vehicle may include one or more braking mechanisms, and the coasting mode may include providing braking via at least one of the braking mechanisms in order to increase a total coasting distance and/or time. Braking in this way may allow a speed of the vehicle to be controlled in such a way that the vehicle may coast further and/or improve its overall fuel efficiency.

The means for identifying the at least one coasting profile may be configured to select a coasting profile that maximises a coasting distance and/or coasting time. Maximising coasting distance and/or coasting time may improve fuel efficiency.

The vehicle may have at least a first speed range that is used in the identifying of the coasting profile, and a second speed range for when the vehicle is not in the coasting mode, wherein the first speed range is wider than the second speed range. The wider first speed range may allow the vehicle to coast further and/or improve its overall fuel efficiency.

The controller may be a coasting control module comprising a processor and/or microcontroller.

According to another aspect of the invention, there is provided a non-transitory computer readable carrier medium carrying computer readable code for controlling a vehicle to carry out the method set out in previous aspects.

According to another aspect of the invention, there is provided a non-transitory computer readable carrier medium carrying computer readable code which when executed causes a vehicle to carry out the method set out in any of the previous aspects.

According to another aspect of the invention, there is provided a computer program product executable on a processor so as to implement the method set out in any of the previous aspects.

According to another aspect of the invention, there is provided a processor arranged to implement the method or the computer program set out in any of the previous aspects.

According to another aspect of the invention, there is provided a vehicle comprising the vehicle coasting system, the non-transitory computer readable carrier medium, the computer program product, or the processor, set out in any of the previous aspects.

According to another aspect of the invention, there is provided a method of controlling coasting of a vehicle, the method comprising:

generating a plurality of coasting profiles for the vehicle, each coasting profile having an initial speed and a starting point on a predicted vehicle path, where each coasting profile represents a predicted vehicle speed over a time and/or distance from the starting point and is generated based on a geometry of at least a portion of the predicted vehicle path;

identifying at least one of the coasting profiles that maintains the speed of the vehicle within the speed range; and controlling a prime mover of the vehicle to place the vehicle into a coasting mode in accordance with the at least one identified coasting profile.

According to another aspect of the invention, there is provided a coasting control system for a vehicle, the system comprising:

means for generating a plurality of coasting profiles for the vehicle, each coasting profile having an initial speed and a starting point on a predicted vehicle path, where each coasting profile represents a predicted vehicle speed over a time and/or distance from the starting point and is generated based on a geometry of at least a portion of the predicted vehicle path;

means for identifying at least one of the coasting profiles that maintains the speed of the vehicle within the speed range; and means for controlling a prime mover of the vehicle to place the vehicle into a coasting mode in accordance with the at least one identified coasting profile.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment may be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
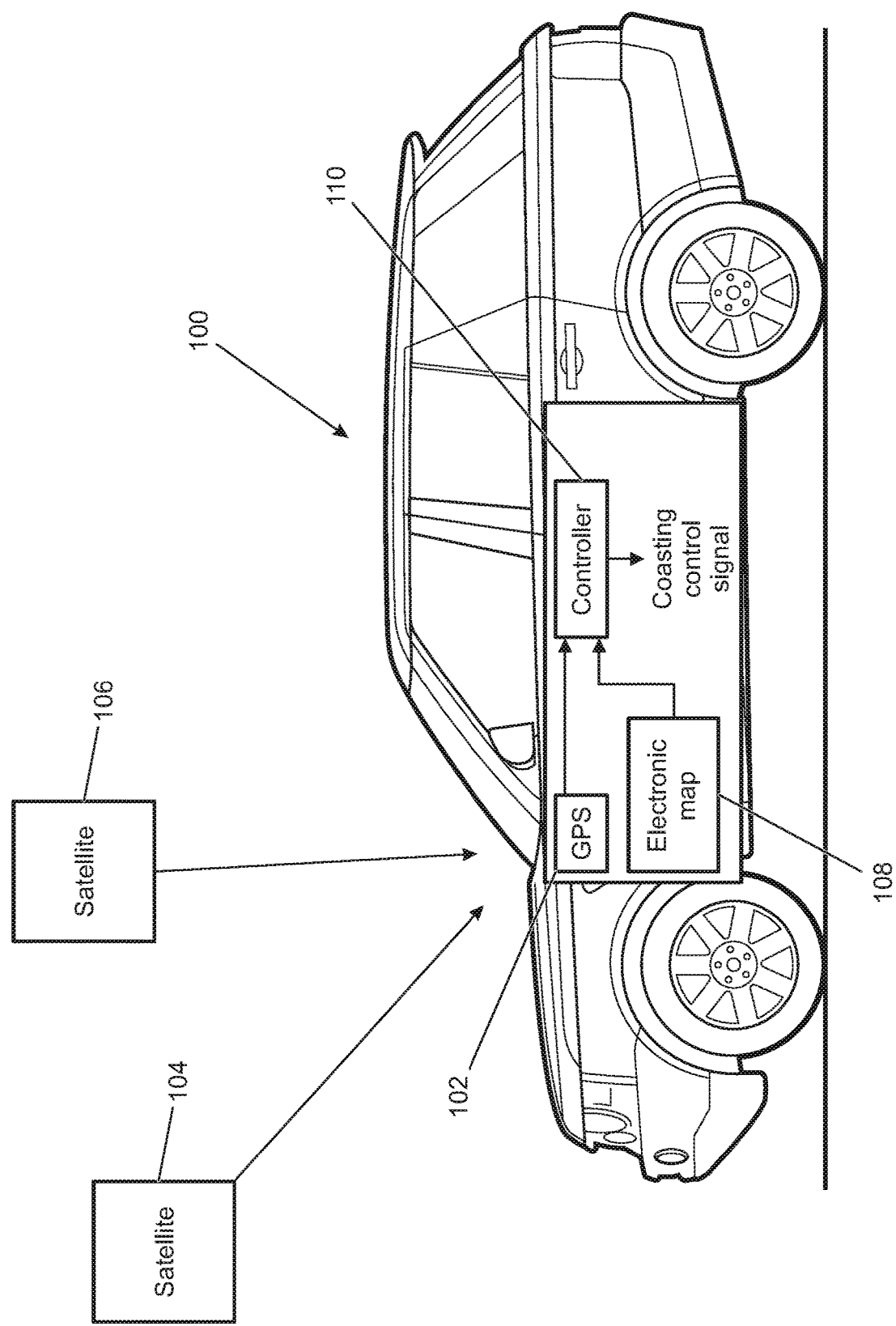
FIG. 1 shows a vehicle in the form of a car comprising apparatus controlling a speed of the vehicle according to an embodiment of the invention.

Referring to FIG. 1, a vehicle 100 is equipped with technology that enables it to anticipate upcoming changes in geometry of a predicted path and in particular, changes in elevation. A GPS unit 102 receives signals from GPS satellites 104 and 106 in a known manner (typically signals from at least three satellites will be received to enable triangulation), and uses the relative time delays of the received signals to triangulate a location of the vehicle 100. The vehicle 100 also has an electronic map unit 108 that stores map information. In the present case, the map information may include, for example, road topography, locations such as cities, towns and suburbs, and points of interest. Geometric data may also be stored by the electronic map unit. The geometric data includes terrain data, and in particular information about changes in elevation. The terrain data may be stored locally or accessed remotely via a wireless network, and may be sourced from the GPS unit 102 or may form part of the map information.

A controller 110 accepts information regarding the current location of the vehicle 100 from the GPS unit 102 and information from the electronic map unit. The controller 110 may use this information to estimate or determine a satellite navigation ("satnav") path that the vehicle will follow. The path may be based on several possibilities. For example, a user of the vehicle may be a driver of the vehicle, may input a destination and all route information into a satellite navigation ("satnav") interface. From this, the vehicle can determine with reasonable certainty the likely path that the vehicle will follow. Where a route is determined in advance, such as when satnav is in use, it may be followed by the vehicle automatically (e.g., in a fully autonomous car), semi-automatically (e.g., using a driver assist function) or by way of voice navigation commands to a human driver.

If the driver is not using the satnav function, a probable path may be calculated based on electronic map information. For example, a vehicle travelling on a highway, motorway or main road is likely to remain on that road, possibly for some distance, and therefore the path is relatively easy to predict.

The electronic map information may optionally be combined with information from vehicle sensors that describe vehicle state. For example, a driver using an indicator while slowing down at a particular point on the road suggests that the driver is about to turn the vehicle in the direction indicated by the indicator selection.

In other embodiments, vehicle to vehicle (V2V) and/or vehicle to infrastructure (V2I) communications may be used to estimate or determine the likely vehicle path. For example, if a V2I communication is received indicating that the road ahead is closed, the vehicle can determine the likely path the driver will take to avoid the closed road.

In yet other embodiments, previous driver behaviour may be used as an input to path estimation. For example, if the driver regularly commutes to and from work around certain times, the vehicle may assume that the destination is home or work when the driver is using the vehicle during those periods, and that the most likely path is that which the driver takes every day.

While illustrated as being within the vehicle 100, it will be appreciated that the controller 110 and/or map unit 108 may be remotely located on one or more servers or other computer(s) accessible by the vehicle 100. The GPS unit 102 will usually be local to the vehicle 100, but in other embodiments the information regarding the current location of the vehicle 100 may be provided in other ways. For example, other forms of location determination may be used, such as different satellite positioning systems (e.g., the European Galileo positioning system), time delay triangulation using telecommunication base stations signals, inertial-based measurement systems, or any combination thereof.

Figure 2:
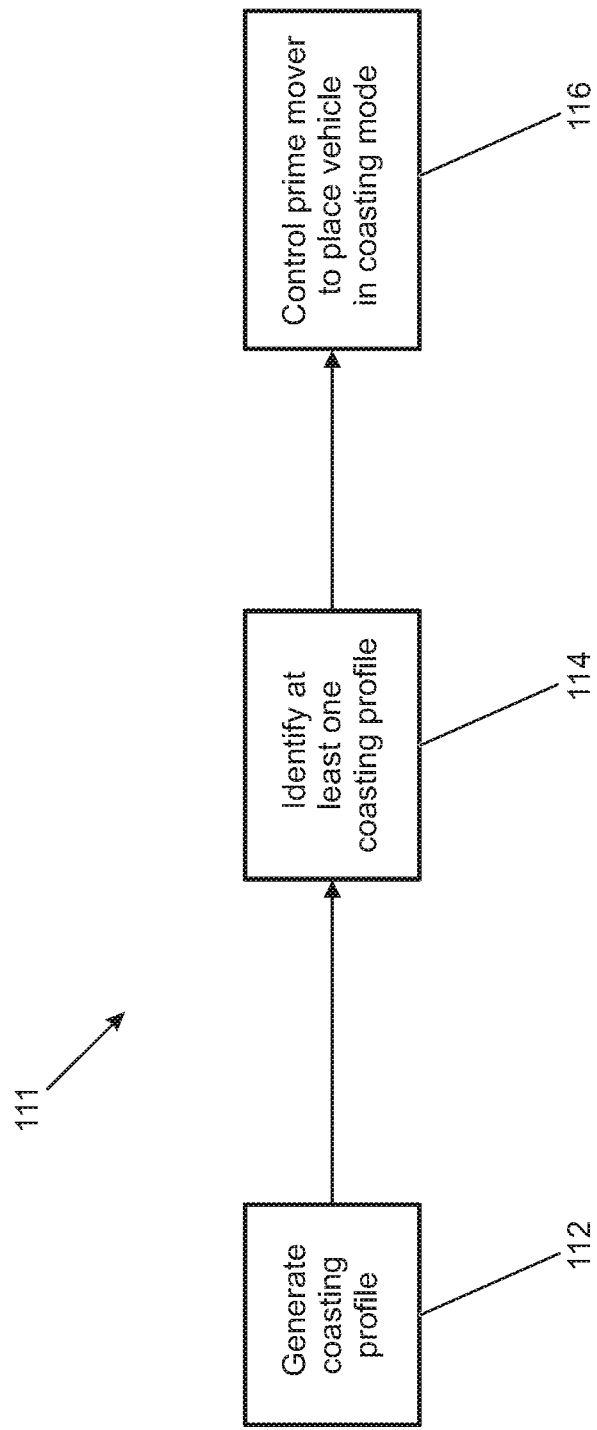
FIG. 2 is a flowchart showing a method of controlling a speed of the vehicle according to an embodiment of the invention.

Referring to FIG. 2, by using terrain data, a method 111 of maintaining the speed of the car within a target speed range may be implemented. A plurality of coasting profiles are generated 112 for the vehicle. Each coasting profile has an initial speed associated with it, and is based on a starting point on a predicted vehicle path. The predicted vehicle path is the current most likely path that the vehicle will take based on, for example, a satnav route that is being followed autonomously, semi-autonomously, or manually by the vehicle's driver. In each case, a prime mover (not shown) will at least partly be controlled by the vehicle in view of the cruise control or driver assist function being engaged. The prime mover is device such as an internal combustion engine, or electric machine, arranged to provide a force by which to propel the vehicle in use, as will be readily understood by one skilled in the art. As will be described in more detail below, each coasting profile represents a predicted vehicle speed over a time and/or distance from that coasting profile's starting point, and is generated based on a geometry of at least a portion of the predicted vehicle path.

At least one of the coasting profiles is identified 114 on the basis that it maintains the speed of the vehicle within the speed range. As described below, the target speed range when in a coasting mode may be wider than when in a non-coasting mode. For example, the target speed range when in a non-coasting mode may comprise a hard limit above and below a nominal cruise control speed. The target speed range when in a coasting mode may comprise a different hard limit above and below a nominal coasting profile. The hard limit in the coasting mode may comprise the hard limit from the non-coasting mode plus a soft limit added to increase the speed range during coasting.

Once at least one coasting profile has been identified, a coasting signal is output. Depending upon the embodiment, the coasting signal may either:

control the prime mover of the vehicle to place the vehicle into a coasting mode in accordance with the at least one identified coasting profile; or provide feedback to a vehicle user to place the vehicle into a coasting mode, such that the vehicle if placed in the coasting mode by the user will coast in accordance with the at least one identified coasting profile. In the case of a conventional or semi-autonomous vehicle, the user may be the driver responsible for controlling the vehicle in use, but in the case of an autonomous vehicle, the user may be any user of the vehicle and may be a vehicle passenger.

In accordance with the first approach, the coasting signal may cause the prime mover of the vehicle to automatically be controlled 116 to place the vehicle into a coasting mode in accordance with the at least one identified coasting profile.

If the current vehicle speed does not presently match that of the initial speed of the selected coasting profile, then prior to placing the prime mover into the coasting mode, a speed of the vehicle is adjusted to match the initial speed of the identified coasting profile.

Figure 3:
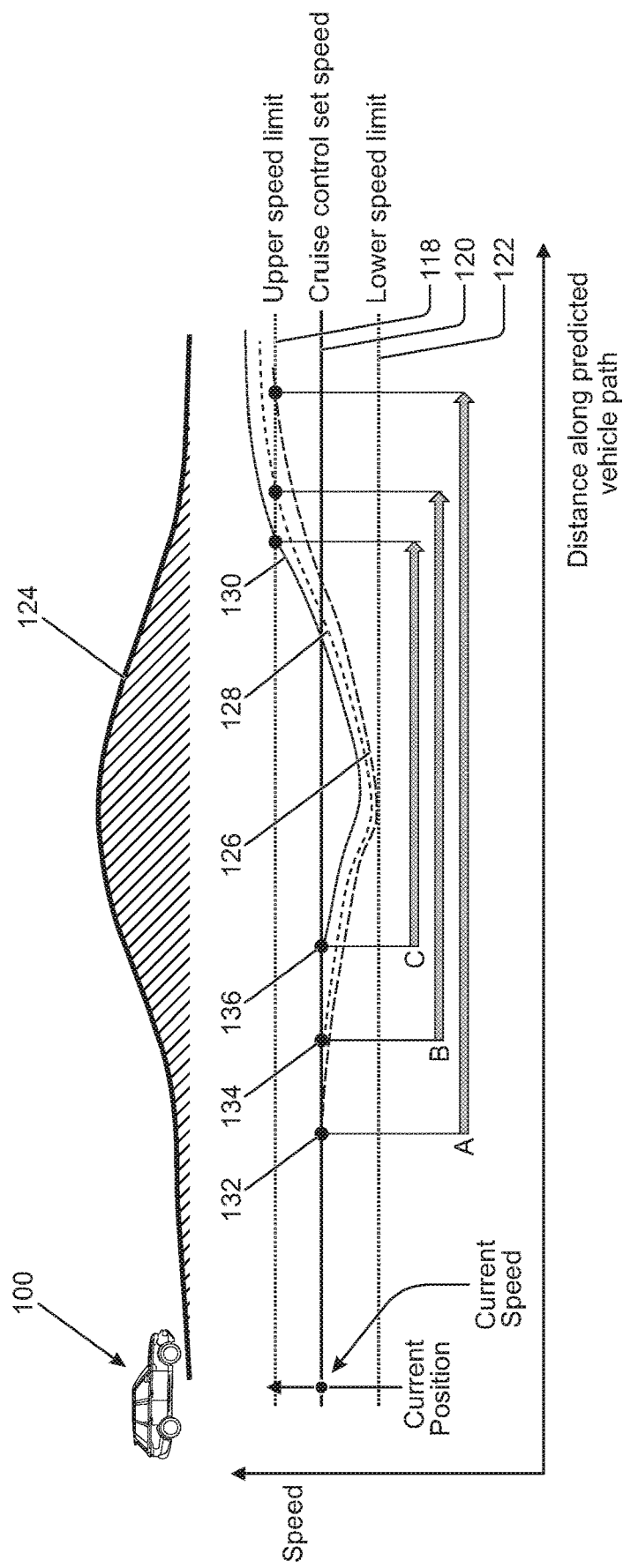
FIG. 3 is a simplified graph showing operation of a method of controlling a speed of the vehicle according to an embodiment of the invention.

Turning to FIG. 3, there is shown a graph of speed versus distance for a vehicle employing an embodiment of the present invention. The upper horizontal line 118 represents an upper speed limit that the vehicle 100 may not exceed during a coasting mode. This upper limit may be determined with reference to several factors, including one or more posted speed limits that apply at various points along the path, speed limits imposed by a need to meet emissions or fuel consumption rules under which the vehicle is operating, or user preference indicated by way of user input (e.g., a user may not feel comfortable travelling above a particular speed). In an embodiment, the upper limit may simply be set as a fixed amount (e.g., 2 mph or 3 km/h) or a percentage (e.g., 2%) above the current cruise control set speed (or above the highest point of an allowable range of cruise control speeds, if such a range is used in a particular implementation).

The middle horizontal line 120 represents a cruise control set speed. This is the nominal speed that the cruise control or driver assist feature is set to maintain. This may be a specific speed (e.g., 60 mph), or a relatively narrow range of speeds (e.g., 60 mph+1/−2 mph).

The lower horizontal line 122 represents a lower speed limit that the vehicle may not fall below during the coasting mode. This lower limit may be set with reference to several factors, including one or more posted minimum speeds that apply at various points along the path, speed limits imposed by a need to meet emissions or fuel consumption rules under which the vehicle is operating (e.g., a particular vehicle may be less efficient below certain speeds due to gearing), and/or user preference indicated by way of user input (e.g., a user may feel frustrated if the vehicle slows down too much, or may be in a hurry on a particular journey). In an embodiment, the lower limit may simply be set as a fixed amount (e.g., in 3 mph or 4 km/h) or a percentage (e.g., 4%) below the current cruise control set speed (or below the lowest point of an allowable range of cruise control speeds, if such a range is used in a particular implementation).

While each of the upper horizontal line 118, middle horizontal line 120 and lower horizontal line 122 are fixed in the graph of FIG. 3, both in absolute terms and relative to each other, the skilled person will appreciate that this need not be the case in particular implementations and/or circumstances. The value of the upper horizontal line 118 may change over the predicted path, for example due to corners that require slower speeds, stop signs or traffic lights, or changes in posted speed limits. The middle horizontal line 120 and lower horizontal line 122 may similarly may change, for corresponding reasons.

Also, the upper and lower speed limits may be further from the middle horizontal line 120 while the vehicle is in the coasting mode. By effectively allowing a wider range of speeds during coasting, the vehicle may be able to take advantage of longer periods of coasting, which in turn leads to lower fuel consumption.

Immediately above the graph is a simplified terrain map 124 showing a geometry of the currently predicted path of the vehicle 100. In an embodiment, this geometry may simply reflect the predicted elevation change of the road for some distance in front of the vehicle (1.6 km, or a mile, for example). For illustrative purposes, the vehicle 100 is shown schematically at the start of the terrain map 124. The horizontal position of the vehicle 100 relative to the terrain map 124 corresponds with the current position on the graph below.

In the embodiment FIG. 3, a first coasting profile 126, and second coasting profile 128 and a third coasting profile 130 are generated. The coasting profiles 126, 128 and 130 all have the same initial speed, which in this example is the same as the current speed of the vehicle 100 (that is, the current speed will be maintained until the start of each coasting profile). First coasting profile 126 has a first starting point 132, second coasting profile 128 has a second starting point 134 and third coasting profile 130 has a third starting point 136. In the illustrated example, these starting points 132, 134 and 136 are equally spaced apart on the predicted path, but in other embodiments non-equal spacing may be employed. For example, for a relatively steep or complex elevation profile within a section of the predicted path, starting points may be chosen closer to each other than in portions having no or more minor elevation changes.

Each coasting profile 126, 128 and 130 represents a predicted speed of the vehicle 100 over a distance from its corresponding starting point 132, 134 and 136.

The first coasting profile 126 shows the car's speed dropping until around the peak of the terrain map 124. A majority of this estimated speed reduction is due to the conversion of kinetic energy to potential energy as the vehicle 100 coasts up a hill. In some embodiments, the coasting profile may solely be based on estimates of speed changes due to this conversion. However, in other embodiments, other factors may also be added to the estimate. For example, the effect of air resistance may be factored in. As those skilled in the art will appreciate, air resistance is higher at higher speeds. Other factors, such as speed loss due to cornering (e.g., due to tyre scrub and/or differential losses), tyre resistance (optionally including the effect of varying tyre pressures), wind, air density (e.g., due to temperature and/or humidity), rain, puddles, road surface type and quality, and known vehicle behaviours at certain speeds or in certain conditions, may also be used in the estimate, whether alone or in combination. Using the vehicle to tow a trailer will also affect the vehicle behaviour and if the vehicle detects it is towing a trailer this may also be used in the estimate. These and other factors may be estimated based on direct measurements (e.g., air pressure and temperature), implicit measurements (e.g., vehicle tyre pressure based on measured deceleration at different speeds when coasting), look-up data (e.g., road surface types may form part of the map information stored or accessed by the electronic map unit 108), or road load or mass prediction (e.g., the vehicle's weight, which may be estimated based on, e.g., occupancy or sensors (not shown) within the vehicle).

As the vehicle 100 passes the crest of the hill shown in the terrain map 124, its speed increases. Over halfway down the hill, the speed is predicted to exceed the current speed of the vehicle 100. Near the end of the hill, the speed is predicted to exceed the upper speed limit represented by upper horizontal line 118. At this stage, some form of braking will be required to ensure that the vehicle does not exceed this speed. An arrow marked 'A' indicates the distance for which the vehicle 100 will be coasting in this scenario.

While the rest of the estimated speed for the first coasting profile 126 is shown in FIG. 3, in a practical application the coasting profile generation process may terminate at this point for this coasting profile. The same applies to all other coasting profiles described herein.

The second coasting profile 128 starts later than the first coasting profile 126, and shows a roughly similar shape. Because the current speed of the vehicle is maintained for longer compared with the first coasting profile 126, the vehicle's minimum speed near the top of the hill is higher than the minimum speed of the vehicle according to the first coasting profile 126. This higher speed carries over into the downhill portion, resulting in the vehicle 100 reaching the upper speed limit of the upper horizontal line sooner than was the case for the first coasting profile. An arrow marked 'B' indicates the distance for which the vehicle 100 will be coasting in this scenario.

The third coasting profile 130 starts later than the second coasting profile 128, and again shows a roughly similar shape. Because the current speed of the vehicle is maintained for longer compared with the first and second coasting profiles, the vehicle's minimum speed near the top of the hill is higher than the minimum speed of the vehicle according to the first and second coasting profiles. This higher speed carries over into the downhill portion, resulting in the vehicle 100 reaching the upper speed limit of the upper horizontal line even sooner than was the case for the second coasting profile. An arrow marked 'C' indicates the distance for which the vehicle 100 will be coasting in this scenario.

Clearly each of the first, second and third coasting profiles will maintain the speed of the vehicle within the target speed range for at least some of the predicted path. As a result, any of these profiles may be identified as being suitable. In the given scenario, the first coasting profile 126 offers the longest coasting distance, and hence may be chosen for implementation. Accordingly, a prime mover of the vehicle 100 may be controlled to place the vehicle into a coasting mode in accordance with the first coasting profile 126.

The prime mover of the vehicle may be any one or more drive sources. In a conventional vehicle, the prime mover may be one or more internal combustion engines such as a two-stroke or four-stroke diesel or petrol engine, or a turbine. In that case, entering a coasting mode may comprise one or more of:

placing a transmission associated with the internal combustion engine into neutral;

disengaging a clutch associated with the internal combustion engine;

engine braking;

turning off the internal combustion engine; and modulating one or more engine system actuators, such as an exhaust gas recirculation valve, variable geometry turbocharger, intake throttle, and continuous variable valve timing, so as to reduce or minimise pumping losses. The engine system actuator may take the form of an engine air system actuator.

An advantage of placing the transmission into neutral and/or disengaging the clutch is that the internal combustion engine is no longer turned via its connection to the drive wheels. Even when an internal combustion engine is turned off, deprived of fuel and/or used for engine braking, there may be significant frictional and pumping losses as a result of the rotation of the crank and reciprocation of pistons, for example.

An advantage of modulating one or more engine system actuators as described above is that air pumping losses may be reduced sufficiently that the engine may not need to be turned off or the clutch disengaged in order to obtain some improvements in fuel efficiency while coasting.

Alternatively, or in addition, the prime mover may include one or more electrical motors, such as a DC or AC motor. In that case, entering a coasting mode may comprise one or more of:

providing no drive via the one or more electrical motors;
providing regenerative braking via the one or more electrical motors; and
providing reduced drive via the one of more electrical motors.

It will be understood that where coasting involves regenerative braking or reduced drive (electrical motors), and/or turning off the engine or engine braking (internal combustion engine), these mechanisms may be deployed in such a way that the deceleration they cause is less than that which would result from any prior art uses of such mechanisms. For example, regenerative braking is generally employed in a way that maximises the amount of energy that may be recovered, within the context of a maximum braking profile for vehicle user comfort. In the present case, the amount of regenerative braking (and/or the reduced drive) may be selected such that the amount of regenerated energy during any regenerative phase is less than the maximum possible had coasting not been employed. When considered over the entire coasting period, however, the net energy position is improved—i.e., coasting results in less energy being used in total, compared with allowing maximal regenerative braking under the maximum braking profile without coasting.

Other states that may be involved when coasting include:

Engine over-run (also known as engine braking, deceleration fuel shut-off, engine connected coasting) is a state in which the internal combustion (IC) engine remains connected to a driveline of the vehicle via a transmission. The vehicle is allowed to roll, without application of the accelerator pedal. In this condition fuel may be cut-off (so called deceleration fuel shut-off or fuel-cut) and the vehicle slowly decelerates due to engine braking ('engine over-run') and other external factors. Such coasting may be referred to as 'engine-connected coasting' and includes the (zero throttle or zero fuelling) condition in which the vehicle can maintain speed without assistance from the IC engine or electric machine, such as rolling downhill, as well as the (zero throttle) level-driving condition in which speed is deliberately permitted to fall without braking of the vehicle wheels by means of the braking system. During engine-connected coasting, IC engine speed is a function of the speed of the vehicle and the gear ratio of the transmission, so is typically higher than idle speed. In an IC engine, relatively high friction and pumping losses cannot be avoided, notwithstanding that fuel is cut-off. Eventually, engine-connected coasting may cause the engine speed to fall to a level at which fuel must be readmitted (the fuel cut-in speed) to avoid stalling of the engine upon fuelling. The engine speed at which fuel supply to the engine is resumed (fuel cut-in speed) is generally close to normal engine idle speed.

Engine-off sail (also known as sailing, freewheeling, high speed free rolling) is a state in which the drivetrain is opened (the internal combustion engine and the transmission are decoupled) and the IC engine is cut. No fuel is used and losses are minimised. As long as there is an efficient method to restart the engine, this is usually the most efficient of coasting states.

Neutral coasting (also known as idle coasting, engine-on sail) is a state in which the vehicle transmission is shifted into neutral, so that engine speed can drop to idle. In an IC engine, fuel must be admitted to the engine to keep it running at idle speed, so that from a fuel economy viewpoint, the advantage of deceleration fuel shut-off is lost, but lower friction windage and pumping losses may apply.

Simulated coasting (hybrid only) is a state in which the engine and/or a belt-integrated starter generator ("BISG"), or crankshaft-integrated motor generator (CiMG), are caused to deliver positive torque to the transmission in an amount sufficient to overcome internal losses associated with the engine, transmission and driveline. The transmission remains connected to the driveline. The amount of positive torque delivered in order to overcome internal losses may be determined in dependence on vehicle speed according to a look-up table. A sub-category of simulated coasting is when an engine produces positive power to charge the high voltage battery through a generator motor.

High-speed stop on the move is a state in which the engine is stopped and speed remains relatively constant due to local conditions. Using knowledge of local gradient (e.g. using e-horizon data) the vehicle maintains a current speed.

Low-speed stop on the move is a state employed during short stops, in which the vehicle cuts the fuel supply to the engine in order to save fuel and then re-starts when it needs to move off. This is known as 'stop-start' and is may be used on both automatic and manual transmission vehicles. Low-speed stop on the move extends the fuel-cut event to the time before the vehicle comes to a complete stop. This stop event relies on certain pre-set conditions such as vehicle speed and brake actuation i.e. the vehicle must be below a certain speed and the driver must have the brake pressed for the engine to cut.

One way of characterising "coasting" as used here is the use of a vehicle's momentum. In at least some embodiments, "coasting" may in particular involve reducing fuel or energy use.

It may be desirable, either universally or in certain situations, to only select coasting profiles for which the coasting mode period exceeds a threshold. This may be for reasons of efficiency, for example because it takes a certain amount of energy to restart an internal combustion engine if it is turned off. Alternatively, or in addition, vehicle user comfort may inform the choice of threshold, for example it may be desirable to avoid the engine being repeatedly stopped and re-started over short periods of time as it may adversely affect vehicle composure and driver comfort as it may otherwise become a source of irritation. A threshold of, for example, 100 metres or yards may be selected as a minimum distance for the coasting mode. In that case, a coasting profile is only implemented if the corresponding coasting mode will be effective for more than 100 metres or yards.

The example above expresses the coasting period within each coasting profile as a distance. It will be appreciated that the coasting period may also be expressed as a time instead of, or as well as, distance. The time may be determined based on the distance and speed over each coasting profile. A threshold time for the coasting mode associated with each coasting profile may be set as a minimum time (e.g., 10 seconds). In that case, a coasting profile is only implemented if the corresponding coasting mode will be effective for more than 10 seconds.

Figure 4:
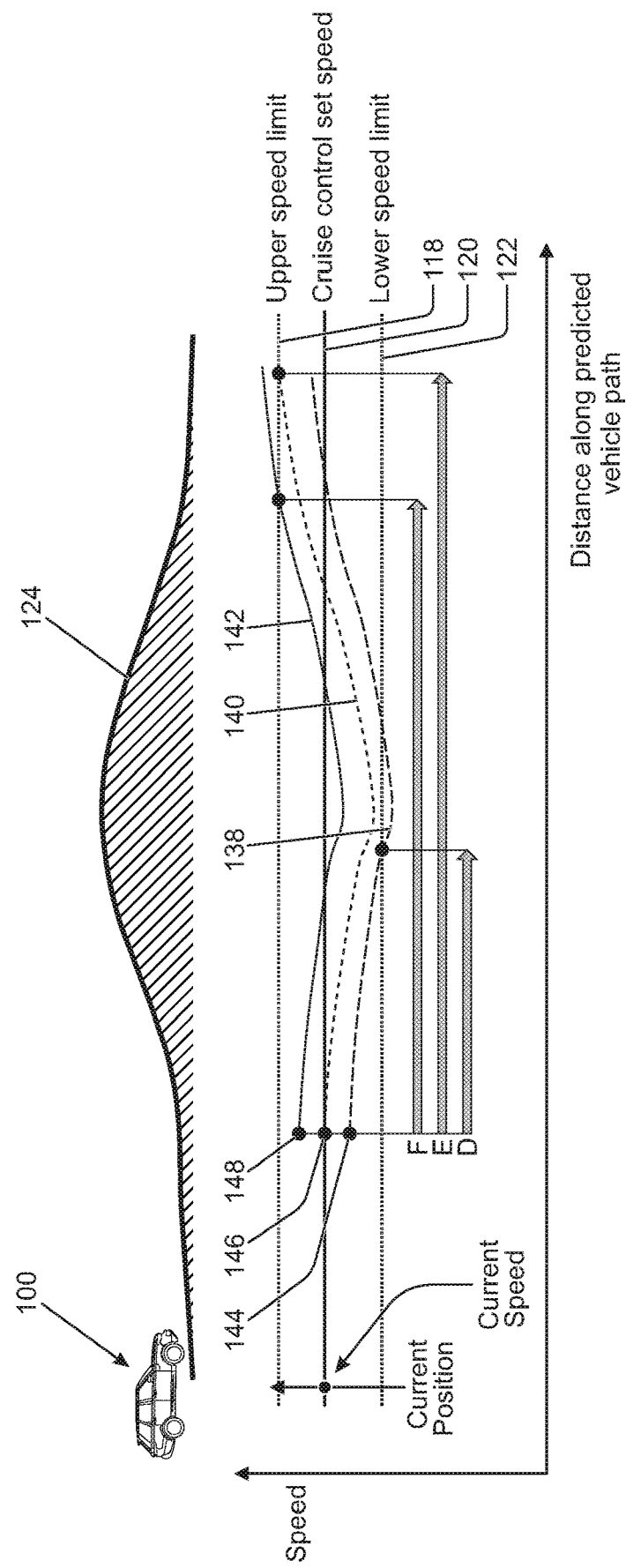
FIG. 4 is a simplified graph showing operation of a method of controlling a speed of the vehicle according to an embodiment of the invention.

Turning to the embodiment of FIG. 4, a plurality of coasting profiles are generated. In this example, a fourth coasting profile 138, and fifth coasting profile 140 and a sixth coasting profile 142 are generated. The coasting profiles 138, 140 and 142 all have the same initial starting point on the predicted path, but have different starting speeds. Fourth coasting profile 138 has a first starting speed 144, fifth coasting profile 140 has a second starting speed 146 and sixth coasting profile 142 has a third starting speed 148. In the illustrated example, the second starting speed 146 is the same as the current speed, and the first starting speed 144 and the third starting speed 148 are equally spaced each side of the second starting speed 144. In other examples, none of the starting speeds of the coasting profiles corresponds with the current speed. The relative spacings of the various starting speeds, and their relative distances from the upper and lower speed limits, may not be the same. For example, the first starting speed 144 may be 3 km/h (or, say, 2 mph) lower than the second starting speed 146, and the second starting speed 146 may be 2 km/h (or, say, 1mph) lower than the third starting speed 148. For example, where there is a relatively steep or complex elevation profile within a section of the predicted path, starting speeds may be chosen closer to each other than in portions having relatively constant elevation.

Each coasting profile 138, 140 and 142 represents a predicted speed of the vehicle 100 over a distance from the starting point.

The fourth coasting profile 138 shows the vehicle speed dropping until around the peak of the terrain map 124. The reasons for the estimated speed reduction may be similar to those discussed above in relation to the FIG. 3 embodiment. In this case, the speed of the vehicle is predicted to drop below the lower speed limit just before the vehicle reaches the peak of the terrain map 124. At this stage, some form of positive torque input will be required from the prime mover to ensure that the vehicle does not fall below this speed. An arrow marked 'D' indicates the distance for which the vehicle 100 will be coasting in this scenario.

If the vehicle is, for example, a hybrid with an electric motor coupled to the transmission and/or at any of the axles, it is possible to provide positive propulsive torque to one or more of the electric motors while coasting so as to prevent the speed dipping below the lower speed limit. In the case of the fourth coasting profile 138, for example, this would make distance D longer.

The fifth coasting profile 140 starts at a higher vehicle speed than the fourth coasting profile 138, and shows a roughly similar shape. The higher starting speed for the fifth coasting profile 140 means that a minimum speed near the peak of the terrain map does not dip below the lower speed limit. This higher vehicle speed carries over into the downhill portion, resulting in the vehicle 100 reaching the upper speed limit of the upper horizontal line. An arrow marked 'E' indicates the distance for which the vehicle 100 will be coasting in this scenario.

The sixth coasting profile 142 starts at a higher vehicle speed than the fifth coasting profile 140, and again shows a roughly similar shape. The higher starting speed for the sixth coasting profile 142 means that a minimum speed near the peak of the terrain map does not dip below the lower speed limit. This higher vehicle speed carries over into the downhill portion, resulting in the vehicle 100 reaching the upper speed limit of the upper horizontal line sooner than was the case for the fifth coasting profile. An arrow marked 'F' indicates the distance for which the vehicle 100 will be coasting in this scenario.

Each of the fourth, fifth and sixth coasting profiles will maintain the vehicle speed within the target speed range for at least some period. As a result, any of these profiles may be identified as being suitable. In the given scenario, the fifth coasting profile 140 offers the longest coasted distance, and hence may be chosen for implementation. Accordingly, a prime mover of the vehicle 100 may be controlled to place the vehicle into a coasting mode in accordance with the fifth coasting profile 140. To do this, the vehicle 100 is maintained at its current speed. In the event that a profile with a different starting speed was chosen, the vehicle 100 may need to be accelerated or decelerated to the starting speed of the chosen coasting profile. Optionally, the additional energy cost of such acceleration (e.g., fuel cost) or deceleration (e.g., lost kinetic energy) may be factored into the choice of coasting profile. One way of reducing the impact of the portion of the predicted path before the starting point(s) of the coasting profiles is to make the starting point(s) for the coasting profiles the current position of the vehicle 100, or at least only a relatively short distance from the current position. Processing time may be a factor in choosing how far ahead of the current position to start estimating coasting profiles.

Figure 5:
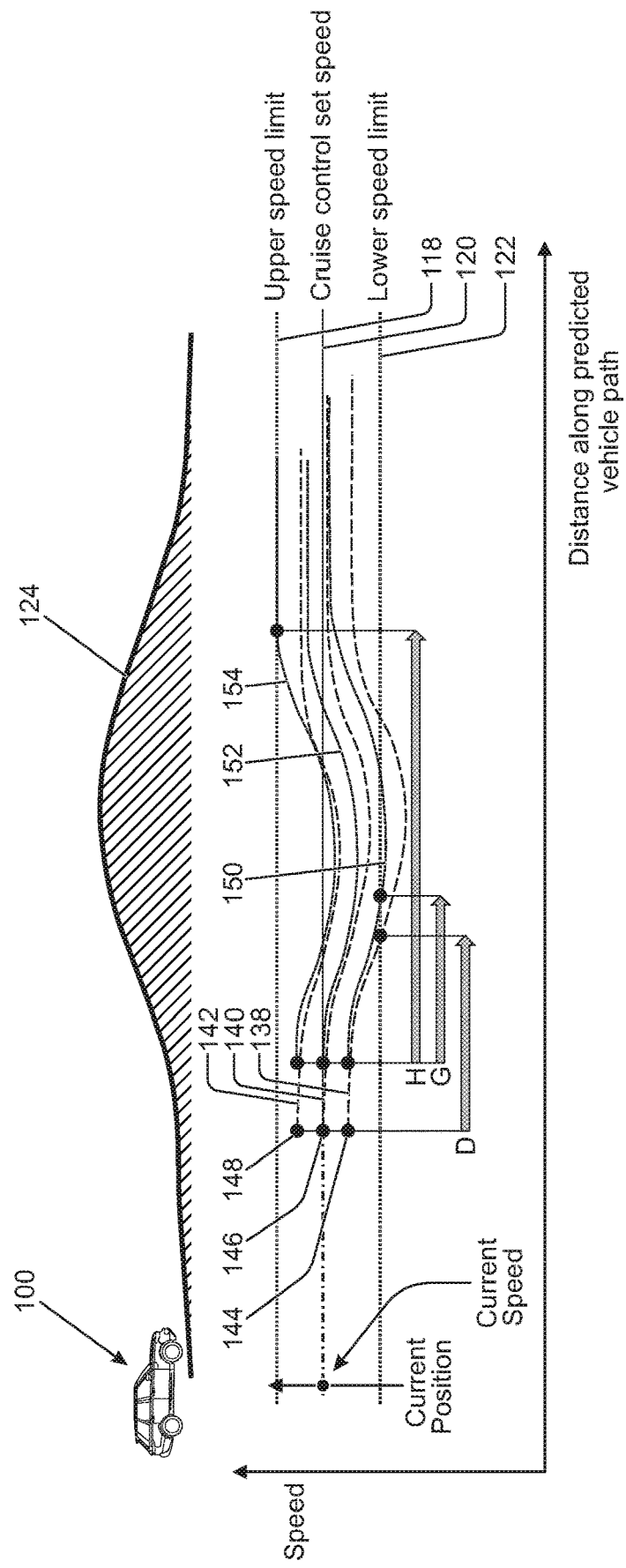
FIG. 5 is a simplified graph showing operation of a method of controlling a speed of the vehicle according to an embodiment of the invention.

Turning to the embodiment of FIG. 5, a grid of coasting profiles is generated, having different starting points and starting speeds. The fourth coasting profile 138, fifth coasting profile 140 and sixth coasting profile 142 are approximately as shown in FIG. 4. Additionally, a seventh coasting profile 150, an eighth coasting profile 152 and a ninth coasting profile 154 are generated, all at a starting point later than the starting point of the fourth, fifth and sixth coasting profiles. The seventh coasting profile 150 has a starting speed corresponding with that of the fourth coasting profile 138 (i.e., the first starting speed 144), the eighth coasting profile 152 has a starting speed corresponding with that of the fifth coasting profile 140 (i.e., the second starting speed 146) and the ninth coasting profile 154 has a starting speed corresponding with that of the sixth coasting profile 142 (i.e., the third starting speed 148).

As with the embodiment described in relation to FIG. 4, the second starting speed 146 is the same as the current speed, and the first starting speed 144 and the third starting speed 148 are equally spaced each side of the second starting speed 146. As described in relation to the embodiment of FIG. 4, none of the starting speeds of the coasting profiles need necessarily correspond with the current speed of the vehicle. The relative spacings of the various starting speeds, and their relative distances from the upper and lower speed limits, may not be the same. For convenience, the starting points and speeds in the FIG. 5 example are grouped—i.e., several coasting profiles have the same starting point and several coasting profiles have the same starting speeds. However, it is not necessary that any coasting profile share a starting point or starting speed with any other coasting profile.

The seventh coasting profile 150 shows the vehicle speed dropping until around the peak of the terrain map 124. The reasons for the estimated speed reduction may be similar to those discussed above in relation to the FIGS. 3 and 4. In this case, the speed of the vehicle is predicted to drop below the lower speed limit somewhat later than the time at which the fourth coasting profile 138 drops below the lower speed limit. At this stage, some form of prime mover input will be required to ensure that the vehicle does not fall below this speed. An arrow marked 'G' indicates the distance for which the vehicle 100 will be coasting in this scenario.

The eighth coasting profile 152 starts at a higher speed than the seventh coasting profile 150, and shows a roughly similar shape. The higher starting speed for the eighth coasting profile 152 means that a minimum speed near the peak of the terrain map does not dip below the lower speed limit. As the vehicle 100 continues along the terrain map 124, its speed increases as it goes down the hill. Despite this acceleration, the vehicle 100 will not exceed the upper speed limit. As such, the vehicle will coast for the full extent of the eighth coasting profile 152.

The ninth coasting profile 154 starts at a higher speed than the eighth coasting profile 152, and shows a roughly similar shape. Again, the minimum speed near the peak of the terrain map does not dip below the lower speed limit. As the vehicle 100 continues along the terrain map 124, its speed increases as it goes down the hill. The coasting profile indicates that the vehicle 100 will exceed the upper speed limit near the bottom of the hill. An arrow 'H' indicates the distance for which the vehicle 100 will be coasting in this scenario.

Each of the fourth to ninth coasting profiles will maintain the vehicle speed within the target speed range for at least some portion of the predicted path, and may therefore be identified as being suitable.

The actual choice of coasting profile to implement may be made on any suitable basis. For example, the coasting profile having the longest coasting duration may be chosen. In the example shown in FIG. 5, the fifth coasting profile 140, sixth coasting profile 142 and eighth coasting profile 152 all result in the vehicle neither exceeding the upper speed limit nor dipping below the lower speed limit. However, the fifth coasting profile 140 and sixth coasting profile 142 start earlier than the eighth coasting profile 152, and therefore offer longer coasting periods. Either of these coasting periods may be chosen.

Alternatively, the speed at the end of each coasting profile may be considered when choosing which coasting profile to implement. In the example shown in FIG. 5, the ninth coasting profile 154 has the highest finishing speed, although braking is required to maintain the vehicle 100 at or below the upper speed limit.

In yet other embodiments, both coasting duration and the speed at the end of each coasting period may be considered. For example, where two or more coasting periods have the same or a similar length, the one with the highest terminal speed may be selected for implementation. In the example shown in FIG. 5, the fifth coasting profile 140 and sixth coasting profile 142 offer the longest coasting duration. However, the sixth coasting profile 142 has the highest speed at the end of the coasting event, and may therefore be chosen for implementation.

There may be other scenarios where lower speeds at the end of a coasting event may be desirable. For example, there may be a low speed corner beyond the end of the period over which coasting is being calculated. There may therefore be an advantage to be had in selecting a coasting profile with a relatively low speed at the end of the coasting event.

Although FIG. 5 shows six coasting profiles (two groups of three starting at the same point, and three groups of two starting at the same speed), the skilled person will appreciate that any number of coasting profiles may be generated. A smaller or greater number of starting speeds may be used for the coasting profiles. Similarly, a smaller or greater number of starting points may be used for the coasting profiles. Some or all coasting profiles may use the same or different starting speeds, or some or all may be grouped with the same starting speed. Some or all coasting profiles may use the same or different starting points, or some or all may be grouped with the same starting point.

The coasting profiles may all terminate at the same point (e.g., a distance from the current position of the vehicle 100, or at some point on the predicted path such as the start of a braking area). Some or all of the coasting profiles may have the same length relative to their respective starting points. Alternatively, some or all of the coasting profiles may have different lengths relative to their respective starting points.

Although the terrain map 124 in illustrated examples shows a single hill comprising uphill and downhill sections, it will be appreciated that the invention applies to other combinations elevation changes as well. FIGS. 6A to 6D show non-exhaustive examples of terrain maps for a predicted path of the car.

Figure 6A:
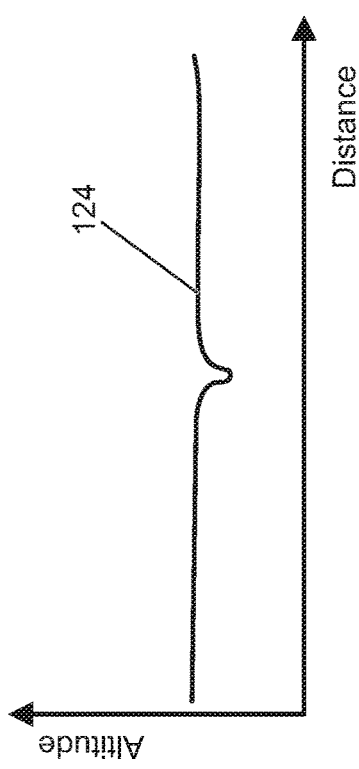
FIGS. 6A to 6D shows graphs showing altitude relative to distance for a number of paths over which a vehicle may implement an aspect of the invention.

FIG. 6A shows a terrain map with a downhill section, followed by a shorter uphill section, an even shorter downhill section, followed by a flat section.

Figure 6B:
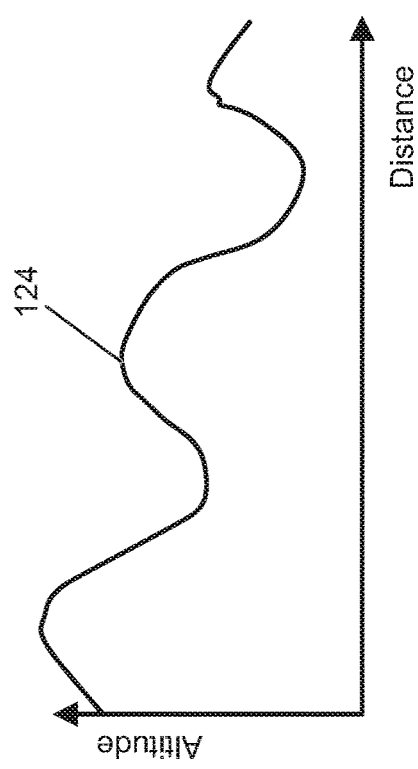

FIG. 6B shows a short uphill section follow by longer downhill and uphill sections.

Figure 6C:
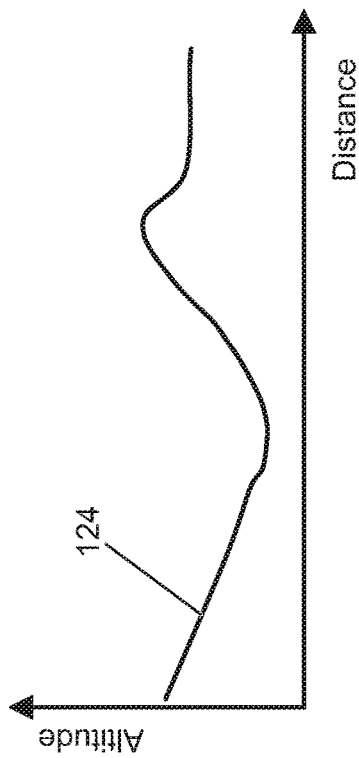

FIG. 6C shows a flat section followed by a short downhill and uphill section, followed by a longer flat section.

Figure 6D:
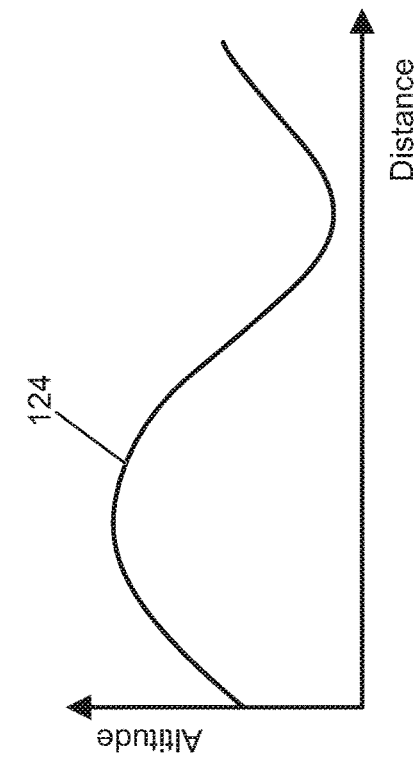

FIG. 6D shows a series of uphill and downhill sections, in which each subsequent peak is lower than the last.

The terrain map 124 may comprise any other combination of uphill, downhill and flat sections. As described above, coasting profiles may be more closely packed where the terrain map 124 includes steep and/or complex elevation profiles. It should expressly be noted that all coasting profiles in FIGS. 3 to 5 are schematic in nature and are not intended to accurately illustrate real-world acceleration and deceleration due to the terrain map.

In one embodiment, the target speed range when in a coasting mode may be wider than when in a non-coasting mode. For example, when in ordinary cruise control or driver assist mode, speed may be controlled to within +1 km/h and −2 km/h (or +1 mph and −2 mph, for example). For the purpose of generating profiles and implementing a selected coasting profile, a different, wider target speed range may be employed. For example, in the coasting mode, the upper speed limit may be +3 km/h (or +2 mph, for example) and the lower speed limit may be −4 km/h (or 3 mph, for example), relative to a nominal speed.

Figure 7:
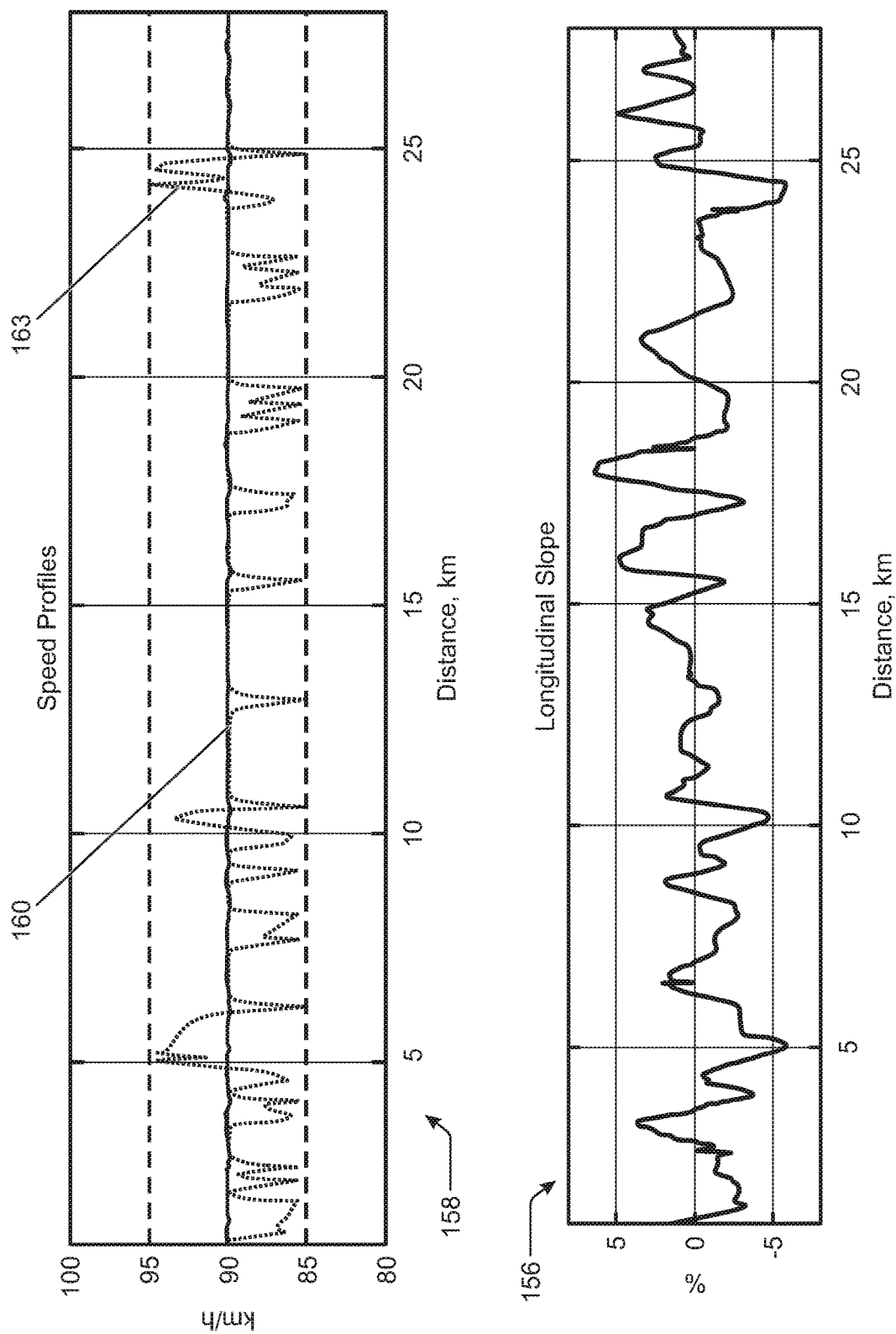
FIG. 7 shows speeds of a vehicle comprising a controller for controlling a speed of the vehicle in different modes of operation, according to an embodiment of the invention.

FIG. 7 shows an example of a vehicle traversing a route. The lower graph 156 shows the gradient of the route (in %) while the upper graph 158 shows the car's speed at each point on the route. In this example, the cruise control speed range is set to allow no deviation from the set speed for non-coasting sections, and +5/−5 km/h for coasting sections. A minimum coasting duration of 6 seconds is set in this example. The solid line 160 of the upper graph 158 represents the instantaneous speed of the vehicle over the route for a journey performed without enabling coasting. It will be noted that there is relatively little speed variance, due to the tight speed range that is used when not coasting. The dotted line 163 represents the instantaneous speed of the vehicle during sections of the journey for which coasting is employed. It will be noted that the speed when coasting (dotted line 163) varies more when compared to the speed when not coasting (solid line 160) over the same sections. This is due to the increased speed range that is allowed during coasting coupled with the effect of the coasting itself. A journey employing coasting will usually take longer than the journey without coasting, but fuel consumption will usually be reduced.

In some examples, there may not be a nominal speed for the coasting mode. The speed range for the purpose of generating the coasting is wider than a speed range that would be used in the event coasting mode is not engaged over the same portion of the predicted path. The upper and lower speeds for the coasting mode may be determined based on road conditions, user preference, posted speed limits, or any suitable combination thereof.

Although speed loss factors such as air resistance, speed reduction due to cornering (e.g., due to tyre scrub and/or differential losses), tyre resistance (optionally including the effect of varying tyre pressures), wind, air density (e.g., due to temperature and/or humidity), rain, puddles, road surface type and quality, and known vehicle behaviours at certain speeds or in certain conditions, have been described as inputs to generating coasting profiles, some or all of these factors may alternatively or in addition be provided as inputs for generation of the terrain map 124. For example, the reduction in speed caused by tyre scrub and/or differential losses as the goes around a corner on the path may be modelled or approximated as an equivalent (in terms of speed reduction) change in elevation. In another example, the reduction in vehicle speed caused by the additional mass and frictional losses associated with using the vehicle to tow a trailer may be similarly modelled or approximated. Similar modelling or approximation may be employed for any other factor. An advantage of this approach is that the number of calculations required to subsequently generate each coasting profile may be reduced.

It will be appreciated that generation of coasting profiles may be an ongoing or iterative process. For example, new coasting profiles may be generated, and/or existing coating profiles updated, on a periodic basis, such as every 5 seconds for example. Coasting profiles may be generated more often, and/or for a greater number of starting speeds, in certain circumstances, such as where the elevation profile represented by the terrain map 124 is complex. By recalculating existing coasting profiles using actual speeds attained during coasting, the models and data used for generating the coasting profiles may be improved for the car, both generally and/or for the particular stretches of road for which coasting profiles are generated. In this way more accurate coasting profiles will be generated, leading to potentially reduced fuel consumption and/or improved vehicle user experience.

A potential effect of coasting is a change in journey time. While in certain circumstances journey time may in theory be reduced, it is more likely that increased coasting will result in increased journey times. As such, the vehicle may be equipped with the ability to selectively switch the coasting mode on, and/or to provide estimates of the impact on journey time that will result from using the coasting mode. In yet other embodiments, several coasting levels may be provided, allowing the driver to select the best compromise between increased coasting (lower fuel consumption) and decreased coasting (faster journey time). The levels may be based on, for example, different coasting speed ranges and/or coasting time/distance thresholds as described above.

Figure 8:
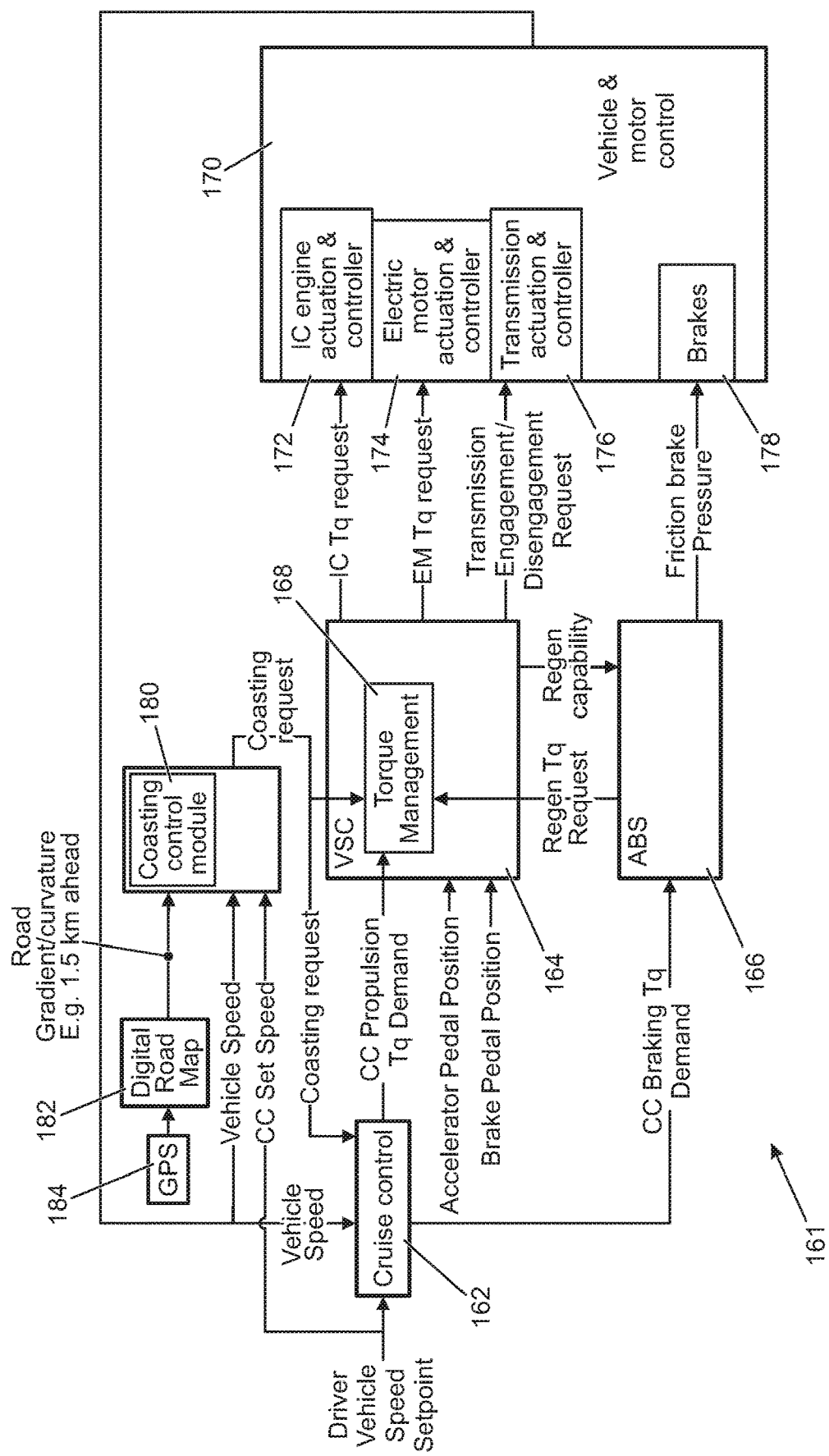
FIG. 8 is a schematic view of an architecture for implementing a method of controlling a speed of the vehicle according to an embodiment of the invention.

Turning to FIG. 8, there is shown an example of a system comprising a vehicle coasting system 161 for maintaining a vehicle speed within a speed range. The vehicle coasting system may take the form of a general purpose processor programmed and configured to implement any of the methods described above. The apparatus may perform related functions, such as cruise control and/or prime mover torque management, or may be entirely separate from the processor(s) that implement such functions. Each of the modules described below may take the form of an individual piece of hardware, or may comprise software that runs on one or more processors.

The vehicle coasting system 161 comprises cruise control module 162 that accepts as inputs a speed setpoint from the driver, the current vehicle speed and a coasting request. The speed setpoint may be input by the driver in any suitable manner known to those skilled in the art, such by manually indicating by way of an input such as a stalk or button when a desired speed is reached, or by inputting a specific desired speed via, for example, a keypad. The cruise control module 162 also accepts as an input the current vehicle speed and a coasting request, the sources of which are described below.

The cruise control module 162 outputs a cruise control propulsion demand to a vehicle supervisory controller (VSC) module 164 and a cruise control braking demand to an ABS braking module 166.

The cruise control propulsion demand is routed to a torque management module 168 within the VSC module 164. The torque management module 168 also accepts as inputs the same coasting request as was received by the cruise control module 162 and a regenerative braking request from the ABS braking module 166.

The VSC module 164 also accepts as inputs an accelerator pedal position and a brake pedal position.

The VSC module 164 outputs an internal combustion (IC) request, an electric motor (EM) request and a transmission engagement/disengagement request. These three requests are supplied to a vehicle and motor control module 170. The IC request is routed to an IC engine actuation and controller module 172, the EM request is routed to an electric motor actuation and controller module 174, and the transmission engagement/disengagement request is routed to a transmission and actuation controller 176.

The ABS braking module 166 accepts as an input a regenerative braking capability signal from the VSC 164. The ABS braking module 166 also outputs a friction brake pressure signal that is supplied to the vehicle and motor control module 170 and routed to brakes 178 of the car.

The vehicle and motor control module 170 outputs the current vehicle speed that was earlier described as being supplied to the cruise control module 162. The current vehicle speed is also supplied to means for generating a coasting profile in the form of a coasting control module 180. The coasting control module 180 also receives as inputs road gradient and curvature from a digital road map 182 and the cruise control set speed. The coasting control module 180 outputs a coasting request to the cruise control module 162 and the torque management module 168.

The digital road map 182 receives current vehicle position information from a GPS unit 184.

In this particular embodiment, all of the modules except a digital road map module 182 and the coasting control module 180 are conventional other than in relation to signalling inputs and outputs required by the addition of the coasting control module 180 and digital road map 182.

In use, the cruise control module 162 operates to maintain the speed of the vehicle within +1 km/h and −2 km/h of a set speed input by the driver when not coasting. In parallel, the coasting control module 180 uses the current speed, the set speed and the digital road map to generate a plurality of coasting profiles, as described above. When a suitable coasting profile is identified and selected for implementation by the coasting control module 180, it outputs a coasting signal that effectively instructs the cruise control module 162 and the torque management module 168 to enter the coasting mode.

In the embodiment illustrated, the coasting signal is sent at the point on the current path of the vehicle corresponding with the starting point of the selected coasting profile.

Alternatively, the coasting signal may be sent earlier to account for delays involved in entering the coasting mode. For example, it may take a small number of seconds to shut down the IC motor, in which case the coasting signal to enter the coasting mode may be sent that number of seconds before the vehicle is expected to arrive at the point on the current path of the vehicle corresponding with the starting point of the selected coasting profile.

Upon receipt of the coasting signal, the cruise control module 162 adopts a wider speed range, such as +2 km/h and −4 km/h, thereby allowing greater increases and decreases in vehicle speed before intervention. The torque management module 168 may instruct the transmission controller module 176 to place the car's transmission into neutral, and/or disengage a clutch to disconnect drive from the IC engine. Alternatively or in addition, the IC engine may be turned off via the IC engine actuation and controller module 172. Any or all of the modules within the vehicle and road module may be controlled to cause the vehicle to coast, in accordance with the definition of coasting given above.

Once the coasting control module 180 determines that the vehicle has reached the end of the selected coasting profile, the coasting request is cancelled. The cruise control adopts the narrower, non-coasting speed range. The torque management module 168 and/or ABS braking module 166 control their respective modules within the vehicle and motor control module 170 as required. This may involve restarting the IC engine, selecting a transmission gear, reengaging the clutch, and/or controlling the IC engine, electric motor, transmission and brakes in accordance with the requirements of the non-coasting mode.

As was the case when sending the coasting signal, an instruction to exit the coasting mode may be issued at the point on the current path of the vehicle corresponding with the end point of the selected coasting profile. Alternatively, the instruction to exit may be sent earlier to account for delays involved in exiting the coasting mode. For example, it may take a small number of seconds to start the IC motor, in which case the instruction to exit the coasting mode may be sent that number of seconds before the vehicle is expected to arrive at the point on the current path of the vehicle corresponding with the end point of the selected coasting profile. Sending the instruction early also ensure that the vehicle has time to take any other steps necessary to ensure consistent driveability and safety.

The coasting mode may also be terminated if the predicted path changes (e.g., the vehicle unexpectedly change route), the current speed deviates too far from that indicated by the coasting profile, or if the current speed exceeds or falls below the coasting mode speed range.

The previous embodiments have described controlling a prime mover of the vehicle to place the vehicle into a coasting mode in accordance with the at least one identified coasting profile. In other embodiments, instead of placing the vehicle into a coasting mode, the coasting signal may cause feedback to be provided to a vehicle user (such as a driver) to place the vehicle into the coasting mode. Such feedback may make any suitable form, such as:

Audible: a sound or synthesised voice is used to provide the feedback;
Visual: one or more of text, images and/or icons may be displayed to the driver by way of an instrument cluster, a heads-up display, a screen, one or more lights, or any other visual indicator; and
Tactile: vibration or other tactile feedback may be provided via one or more actuators in, for example, the steering wheel, seat or foot pedals.

These feedback options are provided as examples only. The skilled person will appreciate that any other form of feedback may be used to tell the driver to place the vehicle into a coasting mode.

The driver may, in response to the feedback, take steps to put the vehicle into the coasting mode. For example, in a manual car, the driver may depress the clutch, and/or place the vehicle transmission into neutral. Alternatively, an input such as a touch-screen or dedicated button may be used by the driver to indicate to the vehicle should enter the coasting mode.

The feedback may be provided immediately before the driver should indicate whether to enter the coasting mode. Alternatively, the driver may be given more notice. In some cases, this may enable to the driver to indicate well in advance that the coasting mode should be entered (e.g., where the vehicle is taking responsibility for placing itself in the coasting mode). In other cases, it gives the driver ample time to get ready to place the vehicle into the coasting mode. The feedback may be split into a preliminary indication, to prepare the driver, and a secondary indication to let the driver know that the vehicle should be placed into the coasting mode.

In all cases, the vehicle may optionally be placed into one of two or more modes, such as, for example:
coasting is entered automatically;
confirmation from the driver is awaited for each coasting event; or
the vehicle should not enter (or provide feedback about) entering the coasting mode.

In other embodiments, an user other than the driver may receive and/or act upon the coasting mode feedback. This may have particular application in, for example, autonomous or semi-autonomous vehicles.

While the various embodiments have described car-based methods and apparatus, the skilled person will understand that the methods and apparatus may be employed to maintain any suitable vehicle's speed within a range. For example, other embodiments may include vans, busses, trucks, and motorbikes.

Although the invention has been described reference to a number of specific non-exhaustive and non-limiting embodiments, the skilled person will appreciate that the invention may be embodied in many other forms.

The invention claimed is:

1. A method of assisting in maintaining a speed of a vehicle within a target speed range, the method comprising:
generating a plurality of coasting profiles for the vehicle, each coasting profile having an initial speed and a starting point on a predicted vehicle path, where each coasting profile represents a predicted vehicle speed over a time and/or distance from the starting point and is generated based on a geometry of at least a portion of the predicted vehicle path;
identifying at least one of the coasting profiles that maintains the speed of the vehicle approximately equal to a current cruise control set speed and within the target speed range of the current cruise control set speed while the vehicle is coasting by identifying one or more of the coasting profiles for which the time and/or distance exceeds a threshold, wherein the target speed range has an upper speed limit above the cruise control set speed and a lower speed limit below the cruise control set speed; and outputting a coasting signal for either:
controlling a prime mover of the vehicle to place the vehicle into a coasting mode in accordance with the at least one identified coasting profile; or
providing feedback to a vehicle user to place the vehicle into a coasting mode, such that the vehicle if placed in the coasting mode by the user will coast in accordance with the at least one identified coasting profile.

2. The method of claim 1, comprising adjusting a speed of the vehicle to match the initial speed of the identified coasting profile prior to:
placing the prime mover into the coasting mode;
providing the feedback to the user; or
receiving from the user a response to the feedback.

3. The method of claim 1, wherein controlling the prime mover to place the vehicle into the coasting mode or the vehicle user placing the vehicle into the coasting mode comprises one or more of:
placing a transmission associated with the prime mover into neutral;
disengaging a clutch associated with the prime mover;
turning off the prime mover; and
modulating one or more engine system actuators, including an exhaust gas recirculation valve, variable geometry turbocharger, intake throttle, and continuous variable valve timing, so as to reduce or minimize pumping losses.

4. The method of claim 1, wherein the vehicle includes an electric machine, and wherein the coasting mode includes providing drive via the electric machine in order to increase a total coasting distance and/or a total coasting time.

5. The method of claim 1, wherein the vehicle includes one or more braking mechanisms, and wherein the coasting mode includes providing braking via at least one of the braking mechanisms in order to increase a total coasting distance and/or a total coasting time.

6. The method of claim 1, wherein the vehicle has at least a first speed range that is used in the identifying at least one of the coasting profiles and a second speed range for when the vehicle is not in the coasting mode, wherein the first speed range is wider than the second speed range.

7. A non-transitory computer readable medium containing computer readable code which when executed causes a vehicle to carryout the method of claim 1.

8. A vehicle coasting system for assisting in maintaining a speed of a vehicle within a target speed range, the system comprising:
at least one processor, and
an electronic memory device,
the at least one processor being configured to
generate a plurality of coasting profiles for the vehicle based upon receiving signals indicative of a value of vehicle speed and upcoming changes in geometry of a predicted vehicle path, each coasting profile having an initial speed and a starting point on a predicted vehicle path, where each coasting profile represents a predicted vehicle speed over a time and/or distance from the starting point and is generated based on a geometry of at least a portion of the predicted vehicle path, wherein the memory device has instructions stored therein,
wherein the processor is configured to access the electronic memory device and execute the instructions stored therein such that it is operable to generate said coasting profiles;
identify at least one of the coasting profiles that maintains the speed of the vehicle approximately equal to a current cruise control set speed and within the target speed range of the current cruise control set speed while the vehicle is coasting by identifying one or more of the coasting profiles for which a coasting time period and/or coasting distance exceeds a threshold, wherein the target speed range has an upper speed limit above the cruise control set speed and a lower speed limit below the cruise control set speed; and
output a coasting signal for either:
controlling a prime mover of the vehicle to place the vehicle into a coasting mode in accordance with the at least one identified coasting profile; or
providing feedback to a vehicle user to place the vehicle into a coasting mode, such that the vehicle if placed in the coasting mode by the user will coast in accordance with the at least one identified coasting profile.

9. The vehicle coasting system of claim 8, wherein the at least one processor is configured to adjust a speed of the vehicle to match an initial speed of the at least one identified coasting profile, prior to:
placing the prime mover into the coasting mode;
providing the feedback to the user; or
receiving from the user a response to the feedback.

10. The vehicle coasting system of claim 8, wherein the at least one processor is configured to do any one or more of:
placing a transmission associated with the prime mover into neutral;
disengaging a clutch associated with the prime mover;
turning off the prime mover; and
modulating one or more engine system actuators, including an exhaust gas recirculation valve, variable geometry turbocharger, intake throttle, and continuous variable valve timing, so as to reduce or minimize pumping losses.

11. The vehicle coasting system of claim 8, wherein the vehicle includes an electric machine, and wherein the coasting mode includes providing drive via the electric machine in order to increase a total coasting distance and/or a total coasting time.

12. The vehicle coasting system of claim 8, wherein the vehicle includes one or more braking mechanisms, and wherein the coasting mode includes providing braking via at least one of the braking mechanisms in order to increase a total coasting distance and/or a total coasting time.

13. The vehicle coasting system of claim 8, wherein the vehicle has at least a first speed range that is used in the identifying the at least one coasting profile, and a second speed range for when the vehicle is not in the coasting mode, wherein the first speed range is wider than the second speed range.

14. A vehicle comprising the vehicle coasting system of claim 8.

* * * * *